United States Patent [19]
Smiley et al.

[11] 3,787,234
[45] Jan. 22, 1974

[54] METHOD OF PRODUCING A THIN FILM LASER

[75] Inventors: Vern N. Smiley, San Diego; Adolph L. Lewis, La Mesa; David K. Forbes, San Diego, all of Calif.

[73] Assignee: The United States of America as represented by the Secretary of the Navy, Washington, D.C.

[22] Filed: July 18, 1969

[21] Appl. No.: 842,916

[52] U.S. Cl............ 117/217, 117/33.3, 117/33.5 E, 117/33.5 CP, 117/106 R, 117/106 A, 117/215
[51] Int. Cl................................................ B44d 1/14
[58] Field of Search.... 117/215, 217, 69, 33.3, 106, 117/33.5 E, 33.5 CP, 223, 224, 106 R, 106 A; 204/192; 331/94.5; 317/235 N; 350/164, 166

[56] References Cited
UNITED STATES PATENTS

| 3,065,112 | 11/1962 | Gilles et al.................. | 117/106 UX |
| 3,254,253 | 5/1966 | Davis et al..................... | 117/33.3 X |
| 3,486,217 | 12/1969 | Congleton et al. ............. | 117/215 X |
| 3,493,289 | 3/1970 | Edwards......................... | 117/106 X |

FOREIGN PATENTS OR APPLICATIONS

| 565,153 | 10/1958 | Canada.............................. | 204/192 |

OTHER PUBLICATIONS

Kitaev, G.A.; Uritskaya, A.A.; Mokrushin, S.G. Conditions for the Chemical Deposition of Thin Layers of Cadmium Sulfide on a Solid Surface. In Chemical Abstracts. 63:15623c. 1965

*Primary Examiner*—Cameron K. Weiffenbach
*Attorney, Agent, or Firm*—J. C. Warfield, Jr.; G. J. Rubens; John W. McLaren

[57] ABSTRACT

A thin layer of laser material is deposited on an appropriate substrate with a second layer of a suitable activator material such as silver or copper, for example, deposited thereover. The deposition of laser material is accomplished at as high a temperature as possible while maintaining a practicable deposition rate. The combination of layers is then baked at a high temperature in air or an inert atmosphere for several hours and slowly reduced to room temperature. The method transforms the film of laser material into a single crystal or several smaller crystallites capable of desirable laser action. In its preferred embodiment reflective coatings, anti-reflective coatings, and multi-layers may be employed to enhance the laser performance.

14 Claims, 4 Drawing Figures

PATENTED JAN 22 1974          3,787,234

INVENTOR.
VERN N. SMILEY
BY ADOLPH L. LEWIS
DAVID K. FORBES

ATTORNEYS

METHOD OF PRODUCING A THIN FILM LASER

STATEMENT OF GOVERNMENT INTEREST

The invention described herein may be manufactured and used by or for the Government of the United States of America for governmental purposes without the payment of any royalties thereon or therefor.

CROSS REFERENCES TO RELATED APPLICATIONS

The method of the present invention is generally related to U.S. Pat. No. 3,573,654, titled Narrow Band Tunable Laser Oscillator-Amplifier, issued Apr. 6, 1971, U.S. Pat. No. 3,573,653, titled Continuously Tunable Thin Film Laser Employing The Electric Field-Effect, issued Apr. 6, 1971, U. S. Pat. No. 3,579,142, titled Thin Film Laser, issued May 18, 1971, and U. S. Pat. No. 3,747,021, titled Wide-Range Continuously Tunable Thin Film Laser, all of which were filed in the name of Vern N. Smiley.

BACKGROUND OF THE INVENTION

Presently known lasers may consist of gas, liquid or solid materials in various forms and configurations of laser cavities. The materials employed include a dielectric crystal, such as ruby, glass or semiconductors. More recently some success has been achieved in the production of lasers comprising thin layers of laser material. In several of the referenced copending applications, extremely thin film lasers are disclosed wherein the thickness of the film of laser material may be of the order of one wavelength or less of the emitted laser energy.

Thin film laser techniques have also been improved, as disclosed in the referenced co-pending applications, by devising laser cavities of thin film configuration which emit a laser beam emerging perpendicular from the plane of the laser material. Accordingly, a relatively large laser beam aperture is provided obviating several undesirable characteristics of prior art thin film lasers in which the laser beam emerged in a direction parallel to the principal plane of the thin film of laser material. Moreover, thin film lasers are extremely compact and small in size which is generally desirable, particularly as contrasted to prior art gas, liquid, and solid lasers which, because of their size, were relatively cumbersome and unwieldy for many otherwise feasible applications.

SUMMARY OF THE INVENTION

The present invention consists of a method of producing a thin film laser device of the type employing a film or layer of laser material having a thickness of the order of one wavelength or less of the emitted laser energy. A thin film of suitable laser material is deposited upon an appropriate substrate base. This may be achieved either by thermal evaporation from a heated source in a vacuum or sputtered in a low pressure gaseous medium, for example. The deposition is accomplished at as high a temperature as is possible while maintaining a practicable deposition rate in order to assure the desired thickness of the film of deposited laser material.

A thin activator layer, which in a typical instance may comprise silver or copper, for example, is then deposited over the film of laser material. The thin film of laser material covered by the film of activator material is then baked at a high temperature in air or alternatively in an inert atmosphere for several hours after which it is reduced to room temperature slowly.

The steps of the method outlined transform the film of laser material into a single crystal or into smaller crystallites capable of lasing action. The resultant thin film of laser material produced by this method operates as a laser oscillator or regenerative amplifier where regeneration is obtained by reflection at the film boundaries. The laser material in its extremely thin film activated form together with the film boundaries behave in the manner of a laser cavity.

In order to produce laser operation, the active laser material in this thin film form must have a very high gain coefficient because of its extremely thin layer dimension. The relation which must be achieved for laser oscillation may be expressed as $$(R_2 R_1)^{1/2} e^{\alpha d} \gtreqqless 1$$

where $d$ is the thickness of the layer of laser material, $R_2$ and $R_1$ are the surface reflectances of the film surfaces, and $\alpha$ is the gain coefficient. An active laser material in thin film configuration formed by the method conceived by applicant may be energized or excited with optical radiation or beams of charged particles such as electrons. Oscillation in the form of narrow-band, coherent optical radiation will be emitted in a direction perpendicular to the principal plane of the film. The wavelength of the emitted wavelength energy depends, of course, upon the choice of laser material.

In order to prevent parasitic oscillations over the plane of the thin film of laser material, the film area may be divided up into small portions or cells which can be coupled together by diffraction or other suitable techniques to produce a coherent beam over the entire aperture comprising the principal plane of the thin film laser material. As an example of a suitable active laser material, it has been found that many of the Group II – VI semiconductor compounds possess sufficiently high gain coefficients to operate successfully in the desired, extremely thin film configuration. In addition other semiconductors and dielectrics may be suitable.

In accordance with the concept and teaching of the present invention, a lower threshold thin film laser oscillator or a more efficient thin film regenerative amplifier may be obtained through a deposited multi-layer array including several alternate high and low index of refraction quarter-wavelength thick, dielectric layers. Such multiple layers may be deposited first on a suitable substrate with the thin film of active laser material being deposited thereon and the activator thin film deposited last before the recrystalization step is carried out as taught by the concept of the present inventive method. Following the completion of those steps of the method, another group of multiple, alternate high and low index of refraction quarter-wavelength thick, dielectric layers may be deposited.

The entire array comprising the groups of dielectric layers on either side of the extremely thin film of laser material effectively form a highly reflecting cavity at the wavelength of the emitted laser energy, but desirably must permit relatively high transmittance of the excitation energy. Additionally, the present invention conceives that several layers of active laser material may be deposited in a multiple layer array to achieve different operative characteristics of the lasing action as may be desired.

Moreover, a stable travelling wave amplifier may be formed by reducing $R_1$ and $R_2$ of the relationship expressed in equation (1) through the use of deposited anti-reflective films on the surfaces of the thin film of active material. As an alternate step in the method of the present invention, film formation may be accomplished through the deposition of the active layer of laser material from a liquid solution.

Accordingly, it is a primary object of the present invention to provide an improved method for the production of a thin film laser wherein the active laser material has a thickness of the order of one wavelength or less of the emitted laser energy.

Another most important object of the present invention is to provide a method of forming a thin film laser which is readily adaptable to the inclusion of multiple layer techniques to improve the efficiency of the lasing action of the thin film of laser material.

Yet another object of the present invention is to provide a method of forming a thin film laser, the steps of which lend themselves to being readily and accurately controllable.

These and other advantages, objects and features of the present invention will be better appreciated from an understanding of the following description of the unique method together with the drawings illustrating several variant types of thin film lasers which may be formed by following the steps of the inventive methods.

The method of the present invention contemplates that a thin film of suitable laser material be deposited on an appropriate substrate base. Such deposition may be accomplished by thermal deposition through evaporation from a heated source in a vacuum, sputtered onto the substrate in a low pressure gaseous medium, or deposition of the thin film of laser material from a liquid solution. The thin film of laser material is then covered by a second film comprising an appropriate activator. For example, certain semiconductor materials may comprise the thin film of laser material and be covered by a second layer comprising an activator of silver or copper. The deposition by vacuum evaporation or sputtering is accomplished at as high a temperature as is possible while still maintaining a practicable deposition rate to adequately build up the desired thickness of the thin film.

Figure 1:
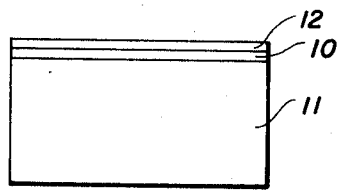
FIG. 1 illustrates the deposition of the layers in accordance with the steps of the method of the present invention.

FIG. 1 illustrates the thin film of laser material 10, deposited upon a suitable substrate which forms a supporting base 11. The thin film of laser material 10 is, in turn, covered by a thin film or layer of a suitable activator 12.

In accordance with the method contemplated by the present invention, the previously described steps of deposition are followed by baking the combination of the supporting substrate 11 together with the layer of laser material 10 and the overlying layer of activator 12 at a high temperature in air or an inert atmosphere for several hours. This step is then followed by reducing the temperature gradually to room temperature at a slow rate. The steps of the method as outlined in their simplest form hereinbefore, cause the thin layer of active laser material 10 to be recrystallized into a film comprising a single crystal or smaller crystallites which are capable of laser action in the preferred manner of operation of a thin film laser.

Figure 2:
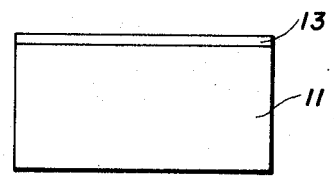
FIG. 2 illustrates the recrystallized thin film of laser material supported on a suitable substrate as formed by the method of the present invention.

FIG. 2 illustrates the resulting recrystallized layer of laser material 13 as supported on the substrate base 11. The activator layer has diffused into the laser layer. As an example of a suitable laser material which may be employed in carrying out the steps of the method of the present invention, a number of semiconductor compounds from the Group II – VI (columns 2 and 6 of the periodic table) may be employed with an activator layer of silver or copper deposited over the semiconductor laser material as described hereinbefore. The resultant thin film of laser material, when recrystallized into a single crystal or smaller crystallite form, will have a thickness of the order generally of one wavelength of the laser energy emitted by lasing action.

Figure 3:
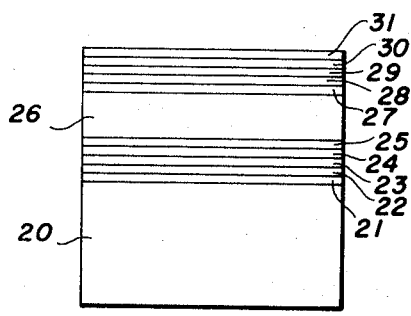
FIG. 3 is an illustration of a thin film laser produced by the method of the present invention and including multiple high reflectance layers on both sides of the thin film of active laser material.

A lower threshold laser oscillator or a more efficient regenerative amplifier may be obtained employing the method of the present invention and the additional deposition of a multi-layer array as shown in FIG. 3. In employing this more particularized method of the present invention, several alternate high and low index of refraction, quarter-wavelength thick, dielectric layers are first deposited on the substrate. The laser material layer is then deposited, followed by the deposition of the activator layer. The step of recrystallization, by baking as taught by the present invention, is then carried out with gradual, slow cooling following. Then another series of alternate high and low index of refraction, quarter-wavelength thick, dielectric layers are deposited over the recrystallized thin film of active laser material to complete the laser cavity. FIG. 3 illustrates the composite, resulting array which comprises a substrate base 20 supporting the multiple layer of alternate high and low index of refraction, quarter-wavelength thick films, the recrystallized thin film of laser material 26, and the second overlying group of alternate high and low index of refraction, quarter-wavelength thick, films 27, 28, 29, 30, and 31. The number of films may be more or less than the specific number illustrated. Generally, a greater number of layers results in a higher reflectance.

The two groups of layers of dielectric material form a highly reflecting cavity for the thin film of laser material at the wavelength of the laser emission energy, but allow relatively high transmittance of the excitation energy which must reach the thin film of laser material 26, as shown in FIG. 3, to raise it to a lasing level. In addition, it may be desirable or necessary in certain application and requirements to deposit more than one active layer of laser material in the composite layers to develop desired operating characteristics.

A highly desirable stable, travelling wave amplifier may be formed by reducing the surface reflectance of the thin film of active laser material employing anti-reflective films disposed on either side of the thin film of laser material. In carrying out the method of the present invention, the described desired result may be achieved by initially depositing an anti-reflective film on the substrate base, followed by a thin layer of the laser material and a thin layer of its activator, respectively. The recrystallization steps of the method of the present invention are then followed out as previously described, and finally a second anti-reflective film is deposited on the exposed surface of the thin film of laser material.

Figure 4:
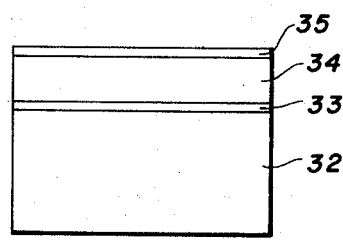
FIG. 4 is an illustration of a thin film laser produced by the method of the present invention and including anti-reflective layers or films deposited upon either side of the thin film of laser material to enhance its operation as a travelling wave laser amplifier.

The resultant travelling wave laser amplifier is illustrated in FIG. 4 where the substrate base 32 is shown supporting thereon a suitable anti-reflective coating 33, a thin film of laser material 34 recrystallized and formed in accordance with the steps of the process of the present invention, and lastly an overlying anti-reflective film 35. The combination as illustrated in FIG. 4, when producing amplification in the manner of a travelling wave amplifier, will be operated with an input signal and a source of excitation energy so as to maintain its operation below the threshold of oscillation, thereby affording amplification of the input signal.

As a typical example of materials and parameters employed in the practice of the method and process of the present invention, CdSe may be used as the active thin film of laser material. The thin coating of CdSe film may be deposited by evaporation of the compound or the separate elements simultaneously in a vacuum at a temperature of approximately 200° to 250°C. A thin film of silver of the order of 10 A to 100 A thick is then applied over the film of CdSe. The next step of recrystallization to form a single crystal or smaller crystallite thin film of laser material, is performed by baking the described layers or films at a temperature of 500°C in an argon or other suitable atmosphere. Similar processes can be carried out for CdS, CdTe and other II – VI compounds. In addition semiconductors in the III – V group and others may be treated in a similar manner if parameters are suitably adjusted for each material.

Accordingly, it may be seen from the described steps of the process and method of the present invention together with the parameters and conditions for carrying out the method that a practical and effective process is provided for the formation of highly desirable extremely thin films of laser material in compact and relatively efficient laser cavities in accordance with the most advanced thin film laser techniques.

In the description of the unique method and process of the present invention, illustrations have been used for the purposes of explanation and it should be appreciated that the figures employed in the illustrative drawings are not drawn to scale in the interests of simplicity and clarity in understanding the relative disposition, order, and relationship of the various overlying films involved in practicing the steps of the method of the present invention. Those knowledgeable and skilled in the art will appreciate that the extremely thin films, layers, and coatings referred to in the foregoing explanation are of the order of a relatively few wavelengths of the energy involved and that the proportions shown in the illustrating drawings are not intended to be scalar representations.

Obviously many modifications and variations of the present invention are possible in the light of the above teachings. It is therefore to be understood that within the scope of the appended claims the invention may be practiced otherwise than as specifically described.

What is claimed is:

1. A method of producing a thin film laser comprising the steps of:

depositing a thin layer of laser material on the plane surface of a substrate while maintaining a maximum temperature compatible with a deposition rate predetermined for optimum control of the thickness of said layer, said layer having a thickness of the order of one wavelength or less of the laser energy emission characteristic of said material;

depositing a thin layer of activator material on said thin layer of laser material; and, baking the deposited layers to form a resultant crystalline film capable of laser action, said resultant film having a thickness $d$, where $(R_2 R_1)^{1/2} e^{\alpha d} \geqq 1$, $R_2$, $R_1$ are the surface reflectances of the film, and $\alpha$ is the gain coefficient of said laser material.

2. A method of producing a thin film laser as claimed in claim 1 wherein said resultant film is in single crystal form.

3. A method of producing a thin film laser as claimed in claim 1 wherein said resultant film is in crystallite form.

4. A method of producing a thin film laser as claimed in claim 1 wherein said laser material is a Group II – VI semiconductor.

5. A method of producing a thin film laser as claimed in claim 1 wherein said activator material is silver.

6. A method of producing a thin film laser as claimed in claim 1 wherein said activator material is copper.

7. A method of producing a thin film laser as claimed in claim 1 wherein said deposited layers are baked in air.

8. A method of producing a thin film laser as claimed in claim 1 wherein said deposited layers are baked in an inert atmosphere.

9. A method of producing a thin film laser as claimed in claim 1 wherein said layer of laser material is deposited by evaporation in vacuum.

10. A method of producing a thin film laser as claimed in claim 1 wherein said layer of laser material is deposited by sputtering in a low pressure gaseous medium.

11. A method of producing a thin film laser as claimed in claim 1 wherein said layer of laser material is deposited from a liquid solution.

12. A method of producing a thin film laser as claimed in claim 1 preceded by the step of depositing an anti-reflective film and followed by the step of depositing an anti-reflective film upon the resultant film.

13. A method of producing a thin film laser as claimed in claim 1 preceded by the steps of depositing several alternately high and low index of refraction, quarter-wavelength thick, dielectric layers.

14. A method of producing a thin film laser as claimed in claim 13 and followed by the steps of depositing several alternately high and low index of refraction, quarter-wavelength thick, dielectric layers.

* * * * *